United States Patent [19]

Kataoka et al.

[11] Patent Number: 4,835,407

[45] Date of Patent: May 30, 1989

[54] AUTOMOTIVE ANTITHEFT KEY ARRANGEMENT

[75] Inventors: Sachiro Kataoka, Ebina; Shunsaku Tsutsumi, Tokyo, both of Japan

[73] Assignees: Nissan Motor Company, Ltd., Yokohama; Kokusan Kinzoku Kogyo Company, Ltd., Tokyo, both of Japan

[21] Appl. No.: 112,338

[22] Filed: Oct. 26, 1987

[30] Foreign Application Priority Data

Oct. 24, 1986 [JP] Japan .................. 61-251988

[51] Int. Cl.⁴ ............................................. B62D 45/00
[52] U.S. Cl. .................................. 307/10.5; 307/10.2; 361/172; 340/825.31; 70/278; 180/287
[58] Field of Search ................. 307/10 R, 10 AT; 361/171, 172, 168.1, 169.1; 340/63, 825.31, 825.32, 64; 250/227, 555, 225, 560, 578; 70/278, 271, 277, 284, 264, 237, 256, 257, 239; 180/281, 287

[56] References Cited

U.S. PATENT DOCUMENTS

| | | | |
|---|---|---|---|
| 4,438,426 | 3/1984 | Adkins .................................. | 340/64 |
| 4,509,093 | 4/1985 | Stellberger ........................ | 361/172 |
| 4,652,860 | 3/1987 | Weishaupt et al. ............. | 361/171 X |
| 4,663,952 | 5/1987 | Gelhard ................................. | 70/278 |
| 4,670,746 | 6/1987 | Taniguchi et al. ........ | 307/10 AT X |
| 4,723,121 | 2/1988 | Boom et al. ..................... | 340/825.31 |
| 4,758,835 | 7/1988 | Rathmann et al. ............. | 340/825.31 |

Primary Examiner—William M. Shoop, Jr.
Assistant Examiner—Paul Ip
Attorney, Agent, or Firm—Foley & Lardner, Schwartz, Jeffery, Schwaab, Mack, Blumenthal & Evans

[57] ABSTRACT

An automotive antitheft key arrangement for locking and unlocking an automotive vehicular door and for operating an ignition system includes a transmitter, first and second receiving means for receiving an input code signal sent from the transmitter unit, and a discriminator including a comparator which compares the input code signal received by the first or second receiving means with a present code signal. The discriminator produces a first or second comparator output when these signals match each other. In response to the first or second comparator output, electrical power is applied to a door lock mechanism for locking and unlocking the door or a starter motor for causing the engine starting operation. The door lock system further includes means for preventing either the first or second comparator output from being produced in response to turn ON or OFF of a starting switch so that the first comparator output is not produced when the second comparator output is produced, and vice versa.

49 Claims, 8 Drawing Sheets

AUTOMOTIVE ANTITHEFT KEY ARRANGEMENT

BACKGROUND OF THE INVENTION

1. Field of the Invention

The present invention relates generally to an automotive antitheft key arrangement for locking and unlocking an automotive vehicle door and for operating an ignition system. More particularly, the invention relates to an automotive antitheft locking system for locking and unlocking a vehicular door by way of a preset mode inputted by pushing a push button on a transmitter.

2. Description of the Prior Art

Japanese Patent First Publication No. 60-10081 shows an electronic locking system for locking and unlocking a vehicle door lock mechanism. In this system, a preset pulse code signal is transmitted from an infrared light-emitting diode provided in an independent transmitter by pushing a push button on the transmitter. The transmitted code signal is received by a receiving portion of a receiver unit installed on the vehicle body. When the received code signal matches with a preset code signal of a controller portion of the receiver unit, an output signal for locking or unlocking the door lock mechanism is produced so that the door is locked or unlocked.

Although such conventional locking system can lock and unlock the vehicular door, it can not assure sufficient security against theft since the disclosed system controls only the door lock mechanism. For instance, since the disclosed system does not control the engine starting operation, picking the lock can not be safely prevented.

SUMMARY OF THE INVENTION

It is therefore a principal object of the present invention to eliminate the aforementioned disadvantage and to provide an automotive antitheft key arrangement which can lock and unlock a vehicle door lock mechanism and which can also control the engine starting operation.

It is further object of the invention to provide an automotive antitheft key arrangement which provides increased security against theft.

In order to accomplish the aforementioned and other specific objects, an automotive antitheft key arrangement of the present invention includes first and second receiving means for receiving an input code signal sent from a transmitter. The input code signal received by the first and second receiving means are respectively compared with a preset code signal by means of a discriminator having a comparator. When these signals match each other, the discriminator produces a first or second comparator output. In response to the first or second comparator output, electrical power is applied to a door lock mechanism for locking and unlocking the door or a starter motor for commencing the engine starting operation. The key arrangement further includes means for preventing either the first or second comparator output from being produced in response to turning ON or OFF a starting switch so that the first comparator output is not produced when the second comparator output is produced, and vice versa.

According one aspect of the present invention, the automotive antitheft key arrangement comprises:

a door lock mechanism for locking and unlocking a vehicular door in response to driving an actuator;

a starter motor for driving an ignition system;

a power source for supplying electrical power to the actuator and the starter motor when communication therebetween is established;

a mechanically operable key for operating a starter switch;

a transmitter unit having first code signal preset means for presetting a first pulse signal, and sending means for producing a first code signal in synchronism with the first pulse signal and for sending the first code signal in response to depressing a push button provided thereto;

a receiver unit having first and second receiving means for receiving the first code signal;

a discriminator having second code signal preset means for presetting a second code signal, and a comparator for comparing the first code signal received by the first receiving means with the second code signal to produce a first comparator output when the starter switch is turned ON, and for comparing the first code signal received by the second receiving means with the second code signal to produce a second comparator output when the starter switch is turned OFF;

an output circuit for transmitting electrical power from the power source to the actuator in response to the second comparator output for driving the door lock mechanism; and means for establishing the communication between the power source and the starter motor in response to the first comparator output when the starter switch is turned ON.

The means may comprise a first transistor which is turned ON in response to turning ON of the starter switch, a relay which is turned ON in response to turning ON of the first transistor so as to block the communication between the power source and the starter motor when the starter switch is turned ON, and interlocking means for causing the first transistor to be turned OFF in response to the first comparator output so as to establish the communication between the power source and the starter motor when the starter switch is turned ON. The interlocking means preferably includes a second transistor. The transmitter unit is preferably installed in the mechanically operable key and the push button is preferably provided on the key. The sending means may comprise a sending controller producing the first pulse signal, a third transistor which is turned ON in response to the first pulse signal, and a light-emitting diode which emits in response to turning ON of the third transistor to produce the first code signal. Each of the first and second receiving means may comprise a light sensitive diode and a light receiving circuit. The light-sensitive diode may comprise an infrared light sensitive diode. The second code signal preset means may also comprise a memory storage which electrically writes the first code signal inputted from the sending means to be memorized and reads the memorized code signal for applying the latter to the discriminator, and a switching circuit which switches between read and write of the first code signal.

According to another aspect of the present invention, the automotive antitheft key arrangement comprises:

a door lock mechanism for locking and unlocking a vehicular door in response to driving of an actuator;

a starter motor for driving an ignition system;

a power source for supplying electrical power to the actuator and the starter motor when the communication therebetween is established;

a mechanically operable key for operating a starter switch;

a transmitter unit having first code signal preset means for presetting a first pulse signal, and sending means for producing a first code signal in synchronism with the first pulse signal and for sending the first code signal in response to depressing a push button provided thereto;

a receiver unit having first and second receiving means for receiving the first code signal;

a discriminator having second code signal preset means for presetting a second code signal, and a comparator for comparing the first code signal received by the first receiving means with the second code signal to produce a first comparator output when the starter switch is turned ON, and for comparing the first code signal received by the second receiving means with the second code signal to produce a second comparator output when the starter switch is turned OFF;

first means for establishing the communication between said power source and said actuator in response to said second comparator output when said starter switch is turned OFF, and for blocking the communication between said power source and said actuator when a manually operable switching means is turned ON; and second means for establishing the communication between said power source and said starter motor in response to said first comparator output when said starter switch is turned ON.

The first means may comprise first transistor which is turned ON in response to the second comparator output when the manually operable switching means is turned OFF, a first relay which is turned ON in response to turning ON of the first transistor so as to establish the communication between the power source and the actuator when the manually operable switching means is turned OFF, and an interlocking means for causing the first transistor to be turned OFF in response to turning ON of the manually operable switching means. The interlocking means preferably includes a second transistor. The second means may comprise third and fourth transistors and a second relay which is turned ON in response to turning ON of the third transistor so as to block the communication between the power source and the starter motor when the starter switch is turned ON, the fourth transistor causing the third transistor to be turned OFF in response to the first comparator output so as to establish the communication between the power source and the starter motor when the starter switch is turned ON. The starter switch is preferably installed in an ignition key cylinder and the first receiving means is preferably provided on the ignition key cylinder. The manually operable switching means may be an ignition switch or an accessory switch. The transmitter unit is preferably installed in the mechanically operable key and the push button is preferably provided on said key. The sending means may comprise a sending controller producing the first pulse signal, a third transistor which is turned ON in response to the first pulse signal, and a light-emitting diode which emits in response to turning ON of the third transistor to produce the first code signal. Each of the first and second receiving means may comprise a light sensitive diode and a light receiving circuit. The light-sensitive diode preferably comprises an infrared light sensitive diode. The manually operable switching means may also be a warning switch, which detects insertion of the mechanically operable key into a key hole provided in the ignition key cylinder, so that the interlocking means may apply a L-level signal to the first transistor in response to turning ON of the warning switch. The manually operable switching means may also comprise the ignition switch or the accessory switch and the warning switch. In this case, the interlocking means may comprise a second transistor which makes the first transistor OFF in response to turning ON of the ignition switch or the accessory switch, and diodes provided between the first transistor and the warning switch so as to apply a L-level signal to the first transistor in response to turning ON of the warning switch. In addition, the key arrangement of the invention may also include means for blocking the communication between the light sensitive diode and the light receiving circuit of the second receiving means so as to apply the first code signal received by the light sensitive diode of the second receiving means to the light receiving circuit thereof in response to turning ON of the ignition switch or the accessory switch and the warning switch.

According to another aspect of the present invention, the automotive antitheft key arrangement comprises:

a starter motor for driving an ignition system;

a power source for supplying electrical power to the starter motor when the communication therebetween is established;

a mechanically operable key for operating a starter switch;

a transmitter unit having first code signal preset means for presetting a first pulse signal, and sending means for producing a first code signal in synchronism with the first pulse signal and for sending the first code signal in response to depressing a push button provided thereto;

receiving means for receiving the first code signal;

discriminator means having second code signal preset means for presetting a second code signal, and a comparator for comparing the first code signal received by the receiving means with the second code signal to produce a comparator output when the starter switch is turned ON in response to operating the mechanically operable key; and means for establishing the communication between the power source and the starter motor in response to the first comparator output when the starter switch is turned ON.

The means may comprise first and second transistors and a relay which is turned ON in response to turning ON of the first transistor so as to block the communication between the power source and the starter motor when the starter switch is turned ON, the second transistor causing the first transistor to be turned OFF in response to the comparator output so as to establish the communication between the power source and the starter motor when the starter switch is turned ON. The transmitter unit is preferably installed in the mechanically operable key and the push button is preferably provided on the key.

DESCRIPTION OF THE PREFERRED EMBODIMENT

Figure 1:
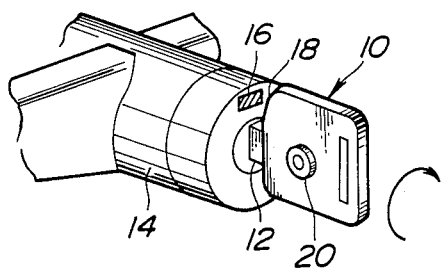
FIG. 1 is a perspective view of an ignition key cylinder, in which a key is inserted into a key hole thereof.

Referring now to the drawings, particularly to FIGS. 1 to 5, the first preferred embodiment of an automotive antitheft key arrangement, according to the present invention, is described below.

Figure 2:
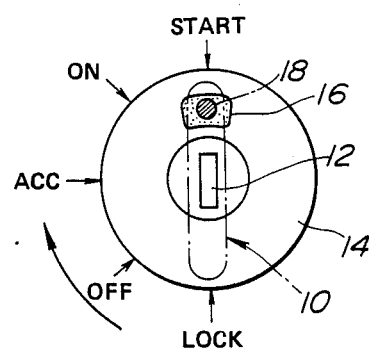
FIG. 2 is a plan view of the key cylinder in FIG. 1, which shows the ignition starting position.

As shown in FIG. 1, a key 10 comprises an essentially rectangular cross-section handling plate or handle 10a and an elongated engaging portion or bit. A key hole 12 receiving the key 10 is formed in an ignition key cylinder 14. The ignition key cylinder 14 is also formed with a light receiving portion 16, which receives a given infrared code signal, above the key hole 12. The handle 10a of the key 10 is provided with a light emitting portion 18, which emits a given infrared code signal, toward the light receiving portion 16 when the key 10 is inserted into the key hole 12 and is rotated clockwise about the longitudinal axis of the key 10 to the ignition start position. The handle 10a of the key 10 is also provided a push button switch 20 so that a given infrared code signal may be emitted from the light emitting portion 18 when the push button switch 20 is depressed. FIG. 2 shows relationship between the positions of the key 10 and the ignition key cylinder 14 when the light emitting portion 18 of the key 10 faces the light emitting portion 16 of the ignition key cylinder 14. When the key 10 is inserted into the key hole 12 and is rotated clockwise about the longitudinal axis of the key 10 to the ignition start position, the light emitting portion 18 of the key 10 faces the light receiving portion 16 of the ignition key cylinder 14 as shown in FIG. 2. When the push button switch 20 is depressed at this position, a given code signal emitted from the light emitting portion 18 is received by the light receiving portion 16 of the ignition key cylinder 14.

Figure 3:
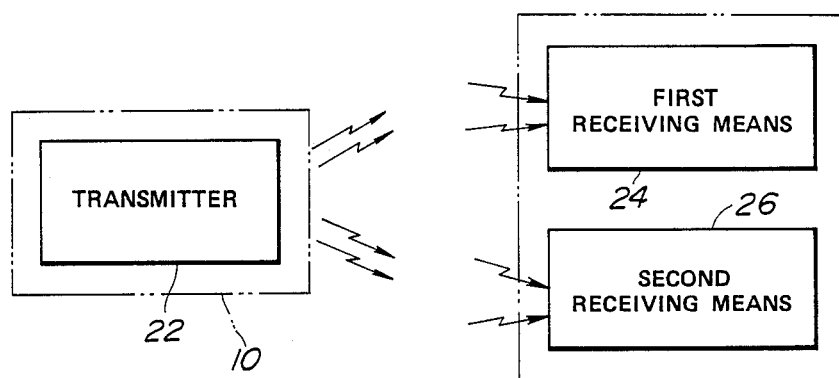
FIG. 3 is a schematic diagram showing send and receive by means of a transmitter and receiver units according to the present invention.

As shown in FIG. 3, a transmitter 22 emitting a given code signal is installed in the key 10. The code signal emitted from the transmitter 22 is received by a first receiving means 24 installed in the ignition key cylinder 14 or a second receiving means 26 installed in the vehicular door.

Figure 4:
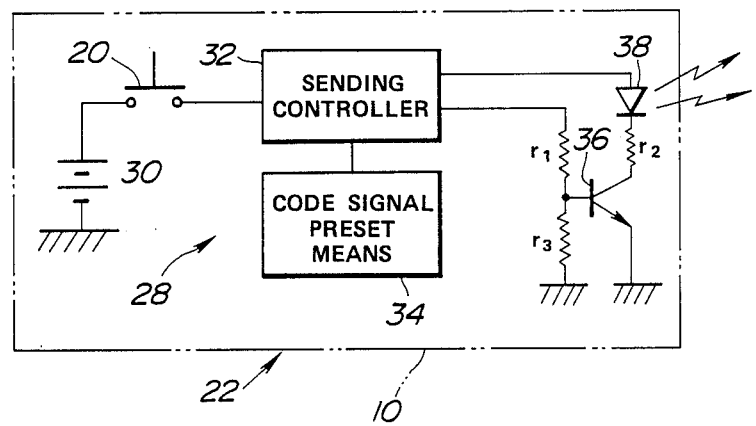
FIG. 4 is a circuit diagram of a sending circuit, according to the present invention, of the transmitter installed in the key shown in FIG. 1.

FIG. 4 shows a sending circuit 28 forming the transmitter 22. A sending controller 32 is connected to a battery 30 via the push button switch 20 so that electrical power is supplied to the sending controller 32 in response to turning ON of the push button switch 20. The sending controller 32 is also connected to a code signal preset means 34 by which the sending controller 32 may output a preset pulse signal in response to turning ON of the push button switch 20. The output terminal of the sending controller 32 is connected to the base electrode of a transistor 36 via a resistor $r_1$ and to the collector electrode of the transistor 36 via an infrared light-emitting diode 38 and a resistor $r_2$. In addition, the base electrode of the transistor 36 is connected to ground via a resistor $r_3$, and the emitter electrode thereof is directly connected to ground. With such construction, when the push button switch 20 is depressed, the sending controller 32 outputs a pulse signal preset by the code signal preset means 34 to supply the latter to the transistor 36. The transistor 36 is turned ON in synchronism with the preset pulse signal, so that the infrared light-emitting diode 38 is turned ON to send a preset code signal. This code signal is received by the first or second receiving means 24 or 26.

Figure 5:
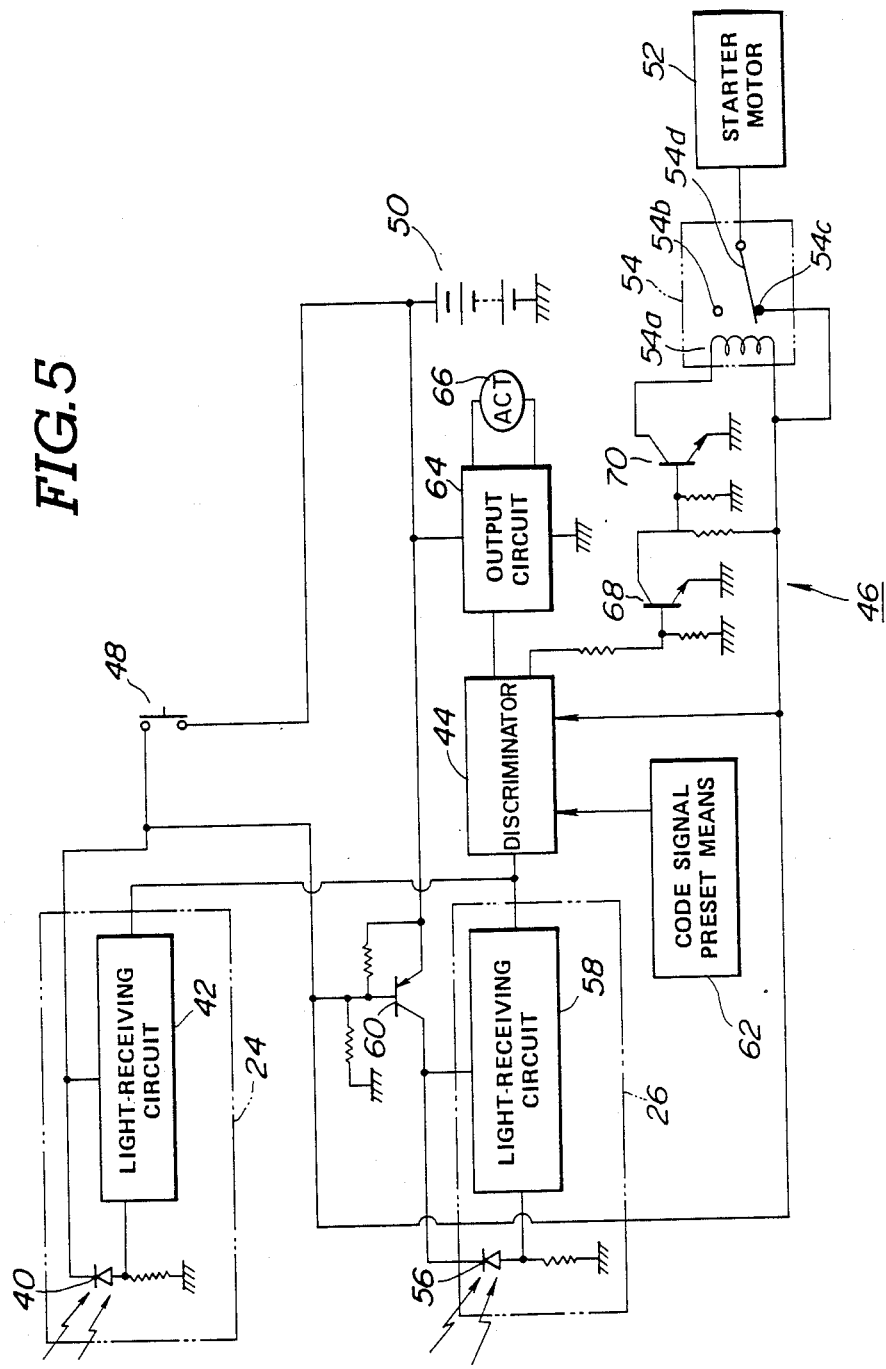
FIGS. 5 to 10 are respectively circuit diagrams of the first to sixth preferred embodiments of an automotive antitheft key arrangement according to the present invention.

As shown in FIG. 5, the first receiving means 24 comprises a first light-sensitive diode 40 and a first light-receiving circuit 42. The first light-receiving circuit 42 receives the preset code signal emitted from the infrared light-emitting diode 38 of the transmitter 22. The first light-receiving circuit 42 performs amplification and waveform shaping of the pulse signal received by the first light-sensitive diode 40 to output the pulse signal to a discriminator 44 connected thereto of a receiver unit 46. In addition, the first light-receiving circuit 42 of the first receiving means 24 is connected to one terminal of a starter switch 48 and the other terminal thereof is connected to a battery 50. The one terminal of the starter switch 48 is also connected to a starter motor 52 via a starter interrupt relay 54 so that the starter motor 52 is in communication with the one terminal of the starter switch 48 when the starter interrupt relay 54 is turned OFF. Therefore, the starter motor 52 becomes active in response to turning ON of the starter switch 48 when the starter interrupt relay 54 is turned OFF. In addition, the one terminal of the starter switch 48 is also connected to the discriminator 44 so that H-level signal is inputted in the discriminator 44 in response to turning ON of the starter switch 48.

The second receiving means 26 comprises a second light-sensitive diode 56 and a second light-receiving circuit 58. The second light-receiving circuit 58 receives the preset code signal emitted from the infrared light-emitting diode 38 of the transmitter 22. The second light-receiving circuit 58 performs amplification and waveform shaping of the pulse signal received by the second light-sensitive diode 56 in response to turning ON of a transistor 60 to output the pulse signal to the discriminator 44 connected thereto of the receiver unit 46.

As mentioned above, the discriminator 44 is connected to the first and second light-receiving circuits 42 and 58. The discriminator 44 includes a comparator which compares a given pulse code signal outputted from the first or second light-receiving circuit 42 or 58 with a given code signal preset by a code signal preset means 62. The discriminator 44 produces the first or second comparator output when the pulse code signal outputted from the first or second light-receiving circuit 42 or 58 matches with the code signal preset by the code signal preset means 62. The second comparator outputs are applied to an input terminal of an output circuit 64 connected to the output terminal of the discriminator 44. The output circuit 64 outputs an output signal to an actuator 66 connected thereto in response to the second comparator outputs, so that a door lock mechanism is driven by the actuator 66, thereby the vehicular door is locked or unlocked.

The output terminal of the discriminator 44 is also connected to the the starter interrupt relay 54 via transistors 68 and 70. The starter interrupt relay 54 comprises a relay coil 54a, stationary terminals 54b and 54c and a movable contact 54d which is in communication with the terminal 54b when electricity passes through the relay coil 54a and with the terminal 54c when it does not pass through the relay coil 54a. The movable contact 54d is connected to the starter motor 52. The transistor 70 is turned ON in response to turning ON of the starter switch 48, so that the starter interrupt relay 54 is turned ON, thereby electrical power is not supplied to the starter motor 52. When H-level signal is inputted in the discriminator 44 in response to turning ON of the starter switch 48, the first comparator outputs are applied to only the transistor 68 serving as interlocking means so as to cause the transistor 68 to be turned ON. When the transistor 68 is turned ON, the transistor 70 is turned OFF, so that the starter interrupt relay 54 is turned OFF. As a result, the starter motor 52 is driven so that an engine may be actuated.

The operation of the present invention is described below.

When the end of the bit of the key 10 is directed to the receiving portion of the second receiving means 26 from the outside of the vehicle and the push button 20 of the key 10 is depressed, a code signal preset by the code signal preset means 34 is sent from the infrared light-emitting diode 38. This signal is received by the second receiving means 26 comprising the second sensitive diode 56 and the second light-receiving circuit 58. As a result, a pulse signal is sent from the second receiving means 26 to the discriminator 44. The discriminator 44 compares the inputted pulse signal with a preset code signal preset by the mode signal preset means 62. When these signals match each other, the discriminator 44 produces a second comparator output to be applied to the output circuit 25. The output circuit 25 produces an output signal to be applied to the actuator 66 in accordance with the second comparator outputs, so that the actuator 66 causes the door lock mechanism to be unlocked. Thus, the locking and unlocking of the door may be performed by means of an infrared signal.

After the unlocking of the door, the driver may get into the vehicular compartment. Thereafter, when the key 10 is inserted into the key hole 12 of the ignition key cylinder 14 to be rotated to the ignition start position, the starter switch 48 is turned ON. In this case, the transistor 60 is turned OFF, so that the second receiving means 26 can not be active. In addition, when the starter switch 48 is ON, the transistor 70 is turned ON, so that the starter interrupt relay 54 is turned ON, thereby electrical power is not supplied to the starter motor 52. Under these conditions, when a given code signal is sent from the transmitter 22 installed in the key 10 by depressing the push button 20 of the key 10, this code signal is received by the first receiving means 24 to be fed to the discriminator 44. The discriminator 44 compares the code signal with the preset code signal and produces a first comparator output. In this case, since H-level signal is inputted to the discriminator 44 in response to turning ON of the starter switch 48, the first comparator outputs are applied to only the transistor 68 so as to cause the transistor 68 to be turned ON. When the transistor 68 is turned ON, the transistor 70 is turned OFF, so that the starter interrupt relay 54 is turned OFF. As a result, electrical power is supplied to the starter interrupt relay 54 so that an engine is actuated.

As mentioned above, according to the first preferred embodiment of the present invention, not only the locking and unlocking of a door lock mechanism but also the controlling of the engine starting operation can be performed. Therefore, security against theft can be improved. In addition, since one device has two functions, the manufacturing cost can be decreased.

Figure 6:
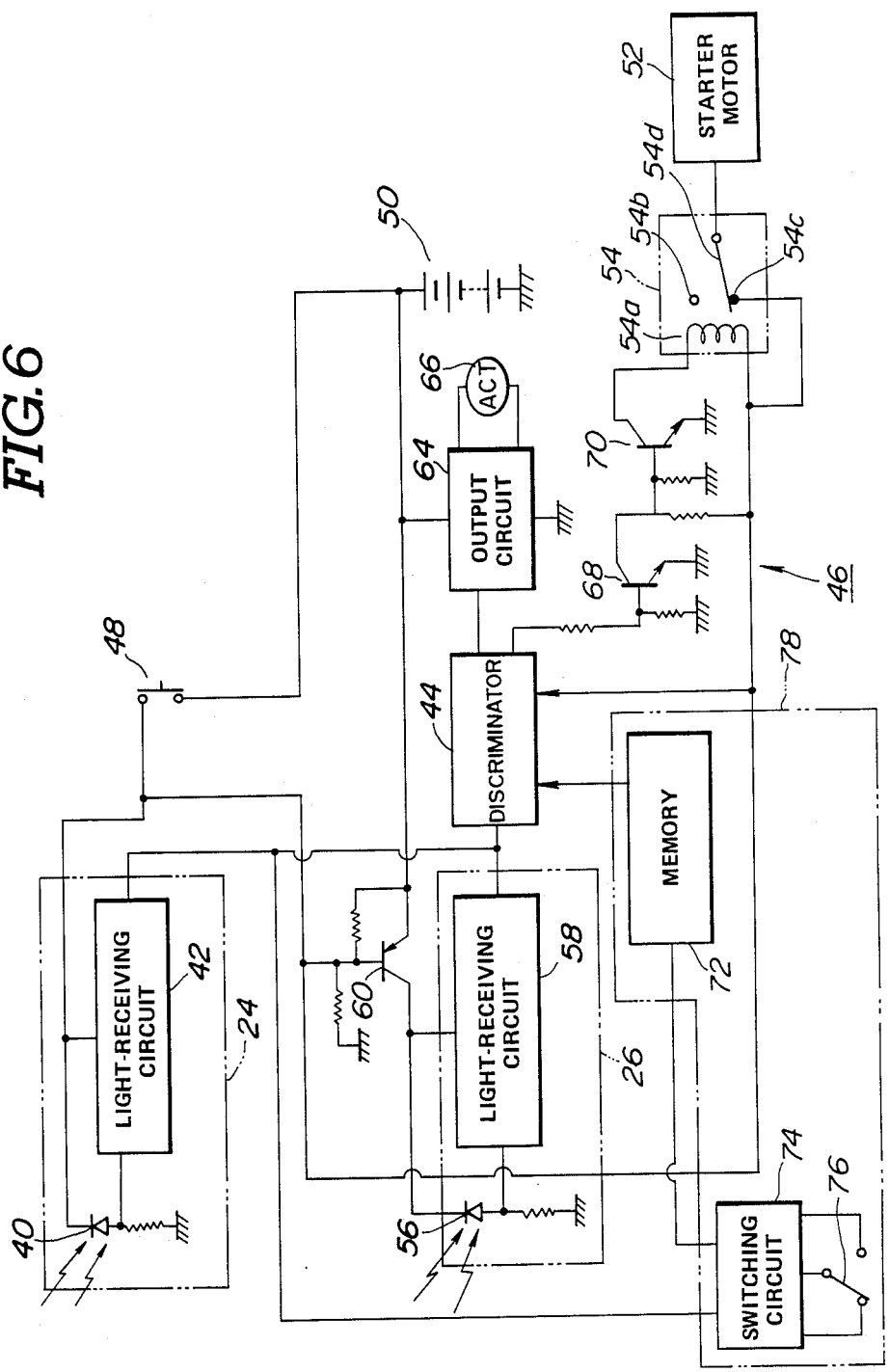

FIG. 6 shows the second preferred embodiment of an automotive antitheft key arrangement, according to the present invention, which may employ the same transmitter unit 22 as that of the first embodiment. In this embodiment, a memory means 72 and a switching circuit 74 are substituted for the code signal preset means 62 used in the first preferred embodiment. The memory means 72 comprises an IC memory which can electrically write the code signal inputted from the transmitter to memorize it and read the memorized code signal to apply it to the discriminator 44. The switching circuit 74, which switches between read and write of the memory means 72, is connected to the memory means 72. In addition, a mode switch 76 is connected to the switching circuit 74. The mode switch 76 can be switched between a writing position, in which a given code signal may be written in the memory 72, and a reading position in which a given code signal may be read out from the memory. A code signal preset unit 78, which is formed by the memory means 72, the switching circuit 74 and the mode switch 76, may be removably installed in the receiver unit 46.

In this construction, after the key 10 is inserted into the key hole 12 of the ignition key cylinder 14 and is rotated to the ignition starting position, the mode switch 76 is switched to the writing position. At this point, when a given code signal is outputted from the transmitter 22 of the key 10, the code signal is memorized in the memory 72. Thereafter, the mode switch 76 is switched to the reading position. Similar to the first embodiment, at the reading position the discriminator 44 may compare a given pulse code signal outputted from the first or second light-receiving circuit 42 or 58 with the memorized code signal.

According to this embodiment, if the key 10 is lost, the code signal preset unit 78 can be changed for another unit and the code which activate the unit can be changed thus preventing any unauthorized person from accessing to the system and further improving security.

Figure 7:
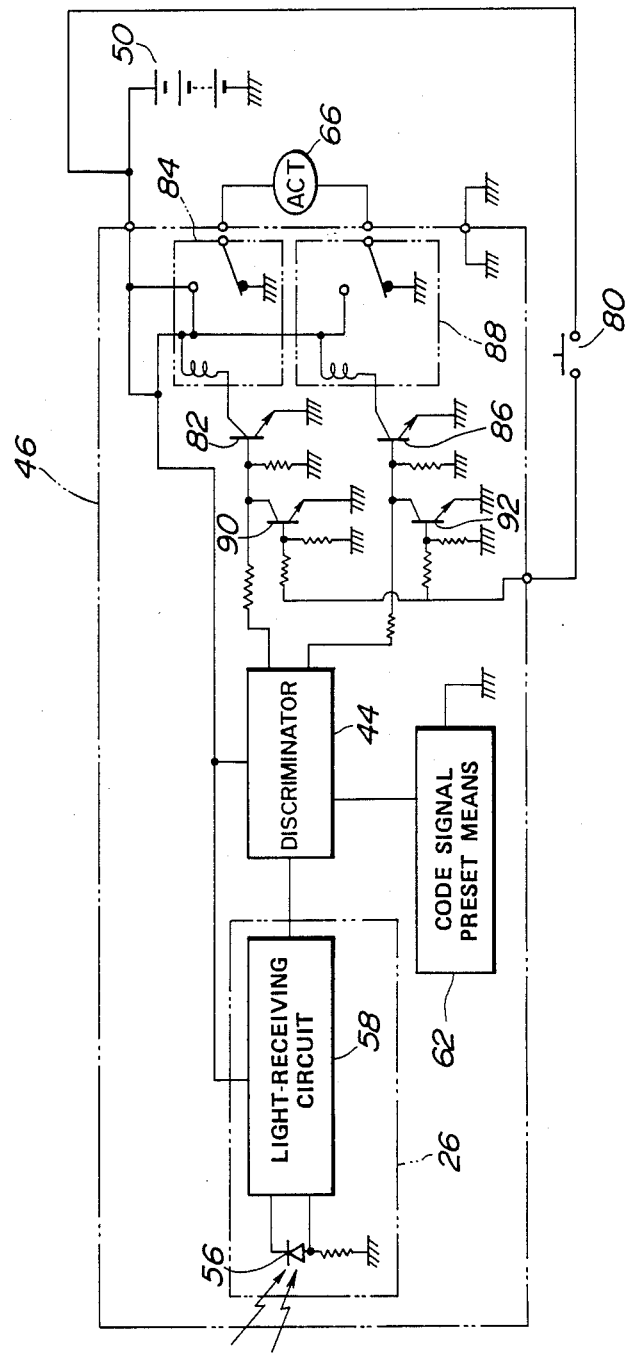

FIG. 7 shows the third preferred embodiment of an automotive antitheft key arrangement, according to the invention, which may employ the same transmitter 22 as that of the first embodiment. In this embodiment, when an accessory switch or an ignition switch 80 is turned ON, the second comparator output is not outputted to the actuator 66.

As shown in FIG. 7, the actuator 66 is connected to a first transistor 82 via a first relay 84. When the first transistor 82 is turned ON, the vehicular door is unlocked by the actuator 66. The actuator 66 is also connected to a second transistor 86 via a second relay 88. When the second transistor 86 is turned ON, the vehicular door is locked by the actuator 66. The first and second transistors 82 and 86 respectively are connected to the discriminator 44 via third and fourth transistors 90 and 92 for interlocking them. The third and fourth transistors 90 and 92 respectively cause the first and second transistors 82 and 86 to be turned OFF when the respective transistors 90 and 92 are turned ON. The third and fourth transistors 90 and 92 are connected to the battery 50 via the accessory switch or the ignition switch 80 so that the third and fourth transistors 90 and 92 are turned ON when the accessory switch or the ignition switch 80 is turned ON. Therefore, when the accessory switch or ignition switch 80 is ON, the first and second transistors are OFF, so that the actuator 66 can not be active. Accordingly, it is possible to prevent the receiver unit 46 from accidentally becoming activated by other sources of infrared light, noise or the like during driving and so forth. As a result, the safety can be improved.

Similar to the first embodiment (although not shown in FIG. 7), in this embodiment, the starter motor 52 may connected to the first light-receiving circuit 42 of the first receiving means 24 via the same circuit, which is formed by the discriminator 44, transistors 68 and 70 and starter interrupt relay 54, as that of the first embodiment.

Figure 8:
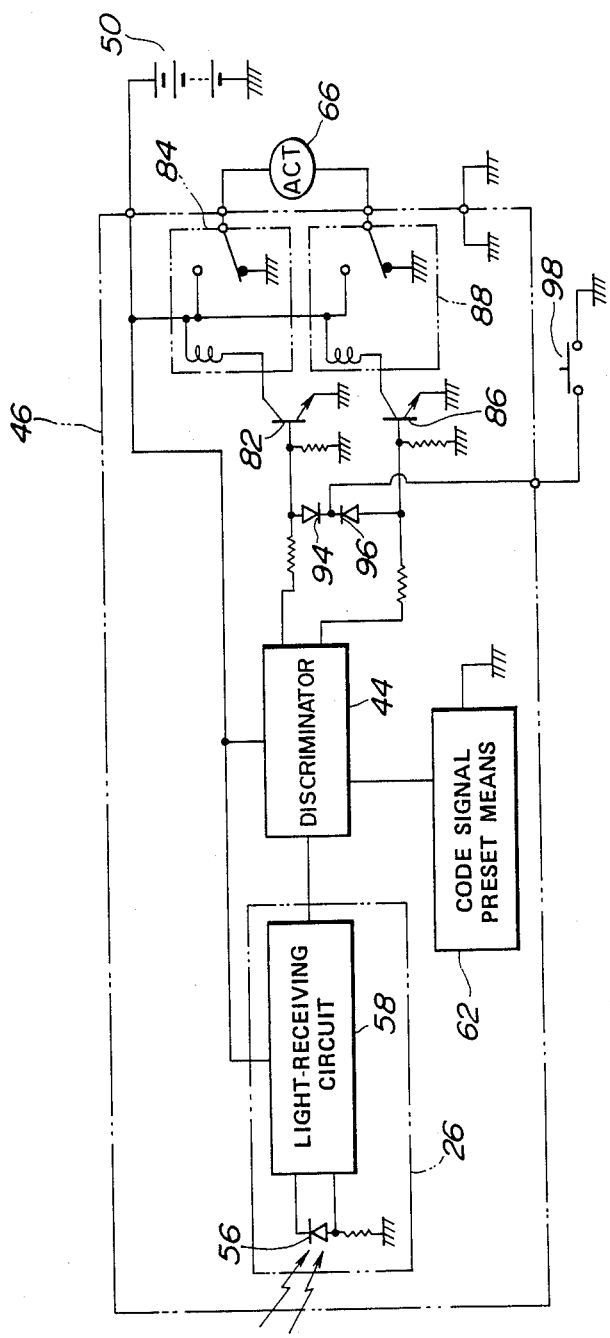

FIG. 8 shows the fourth preferred embodiment of an automotive antitheft key arrangement, according to the present invention, which may employ the same transmitter unit as that of the first embodiment. In this embodiment, when the key 10 is inserted into the key hole 12 of the ignition key cylinder 14, the second coincidence signal is not sent to the actuator 66.

Similar to the third embodiment, the actuator is connected to the first transistor 82 via the first relay 84. When the first transistor 82 is turned ON, the vehicular door is unlocked by the actuator 66. The actuator 66 is also connected to the second transistor 86 via the second relay 88. When the second transistor 86 is turned ON, the vehicular door is locked by the actuator 66. The first and second transistors 82 and 86 respectively are connected to the discriminator 44 via resistors. In addition, diodes 94 and 96 are connected between the first and second transistors 82 and 86. The connecting point between the diodes 94 and 96 is connected to ground via a warning switch 98, which detects insertion of the key 10, so that a L-level signal is inputted to the first and second transistors 82 and 86 when the warning switch 98 is turned ON. Therefore, when the warning switch 98 is turned ON in response to inserting of the key 10, a L-level signal is inputted to the first and second transistors 82 and 86, so that the transistors 82 and 86 are turned OFF, thereby the actuator 66 turns nonactive.

Similar to the first embodiment (although not shown in FIG. 8), in this embodiment, the starter motor 52 may also be connected to the first light-receiving circuit 42 of the first receiving means 24 via the same circuit, which is formed by the discriminator 44, transistors 68 and 70 and starter interrupt relay 54, as that of the first embodiment.

Furthermore, input of a vehicle speed detecting signal (L-level signal) may be substituted for the warning switch 98.

Figure 9:
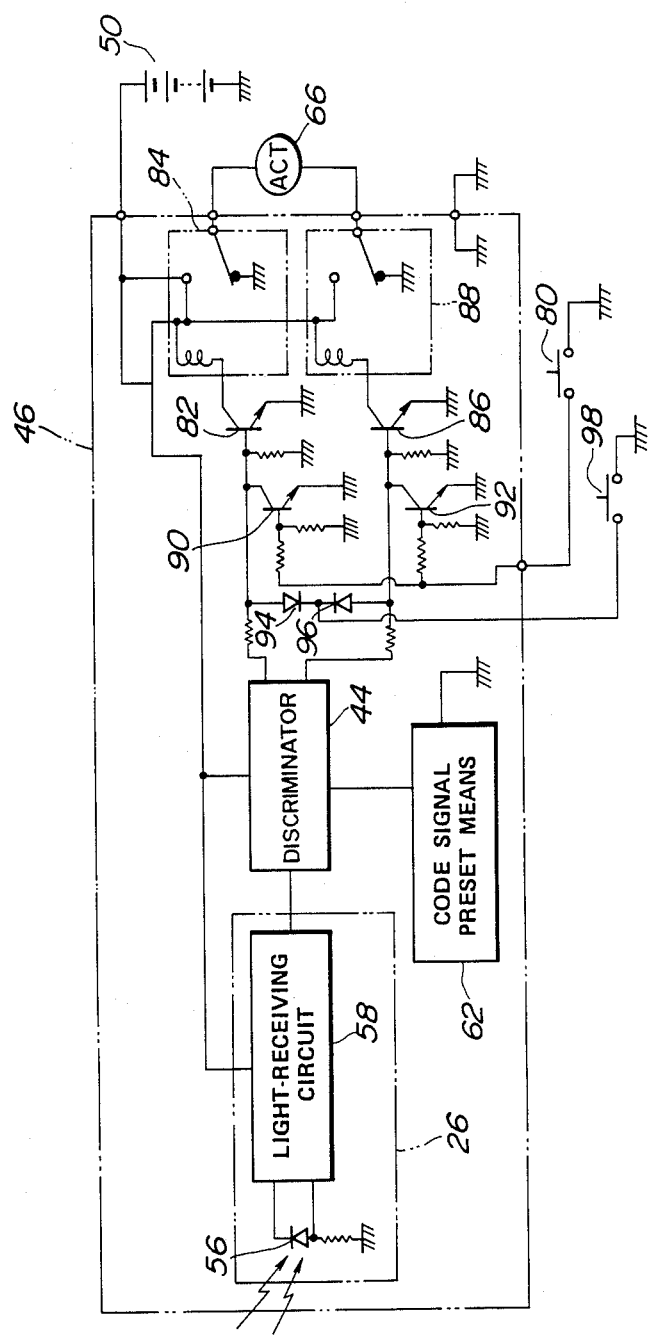

FIG. 9 shows the fifth preferred embodiment of an automotive antitheft key arrangement, according to the present invention, which may employ the same transmitter as that of the first embodiment. In this embodiment, the second coincidence signal is not sent to the actuator 66 either when an accessory switch or ignition switch 80 is turned ON or when the key 10 is inserted into the key hole 12 of the ignition key cylinder 14.

Figure 10:
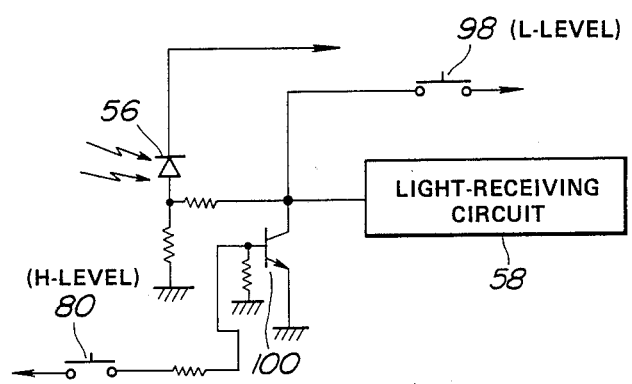

FIG. 10 shows the sixth preferred embodiment of an automotive antitheft key arrangement, according to the present invention, which may employ the same transmitter unit as that of the first embodiment. In this embodiment, a transistor 100, the emitter electrode of which is connected to ground, is provided between the light-sensitive diode 56 and the light-receiving circuit 58. The collector electrode of the transistor 100 is connected to the warning switch 98 (key insertion detecting switch) and the base electrode thereof is connected to the accessory switch or ignition switch 80. This construction may be combined with one of the first to the fifth preferred embodiment. Therefore, when the accessory switch or ignition switch 80 is turned ON or when the warning switch 98 is turned ON, the transistor 100 may be turned ON or OFF. As a result, no signal may be inputted from the light sensitive diode 56 to the receiving circuit 58, so that the actuator 66 may become nonactive.

As mentioned above, an automotive antitheft key arrangement according to the present invention may not only operate a vehicle door lock mechanism, but also control the engine starting operation. As a result, this system can provide improved security against theft. In addition, since one device has two functions, the manufacturing cost thereof can be decreased.

In addition, by using an interchangable code signal preset means of the receiver unit, this system can be made secure by changing the code even if the key is lost. Therefore, security may be further improved.

It is further possible to prevent the actuator for locking and unlocking the vehicle door lock mechanism from accidentally turning active due to infrared light, noise or the like encountered during driving and so forth. As a result, the safety can be improved.

As mentioned above, according to the present invention, the ignition system is not only mechanically but also electrically operated. Therefore, sufficient security against theft may be achieved. Furthermore, although the transmitter 22 is installed in the key 10 according to the aforementioned embodiments, it can also be independent of the key 10 according to the present invention. For example, the transmitter 22 can be installed in an independent card.

What is claimed is:

1. An automotive antitheft key arrangement for locking and unlocking a vehicular door and for operating an ignition system, which comprises:
    a door lock mechanism for locking and unlocking said vehicular door in response to driving an actuator;
    a starter motor for driving said ignition system;
    a power source for supplying electrical power to said actuator and said starter motor when the communication therebetween is established;
    a mechanically operable key for operating a starter switch;
    a transmitter unit having first code signal preset means for presetting a first pulse signal, and sending means for producing a first code signal in synchronism with said first pulse signal and for sending said first code signal in response to depressing a push button provided thereto;
    a receiver unit having first and second receiving means for receiving said first code signal;
    a discriminator having second code signal preset means for presetting a second code signal, and a comparator for comparing said first code signal received by said first receiving means with said second code signal to produce a first comparator output when said starter switch is turned ON, and for comparing said first code signal received by said second receiving means with said second code signal to produce a second comparator output when said starter switch is turned OFF;
    an output circuit for transmitting electrical power from said power source to said actuator in response to said second comparator output for driving said door lock mechanism; and first means for establishing the communication between said power source and said starter motor in response to said first comparator output when said starter switch is turned ON.

2. An automotive antitheft arrangement as set forth in claim 1, wherein said first means comprises a first transistor which is turned ON in response to turning ON of said starter switch, a relay which is turned ON in response to turning ON of said first transistor so as to block the communication between said power source and said starter motor when said starter switch is turned ON, and interlocking means for causing said first transistor to be turned OFF in response to said first comparator output so as to establish the communication between said power source and said starter motor when said starter switch is turned ON.

3. An automotive antitheft key arrangement as set forth in claim 2, wherein said interlocking means includes a second transistor.

4. An automotive antitheft key arrangement as set forth in claim 3, wherein said transmitter unit is installed in said mechanically operable key and wherein said push button is provided on said key.

5. An automotive antitheft key arrangement as set forth in claim 4, wherein said sending means comprises a sending controller producing said first pulse signal, a third transistor which is turned ON in response to said first pulse signal, and a light-emitting diode which emits in response to turning ON of said third transistor to produce said first code signal.

6. An automotive antitheft key arrangement a set forth in claim 5, wherein each of said first and second receiving means comprises a light sensitive diode and a light receiving circuit.

7. An automotive antitheft key arrangement as set forth in claim 6, wherein said light-sensitive diode comprises an infrared light sensitive diode.

8. An automotive antitheft key arrangement as set forth in claim 1, wherein said second code signal preset means comprises a memory storage which electrically writes said first code signal inputted from said sending means to be memorized and reads said memorized code signal for applying the latter to said discriminator, and a switching circuit which switches between read and write of said first code signal.

9. An automotive antitheft key arrangement as set forth in claim 8, wherein said transmitter unit is installed in said mechanically operable key and wherein said push button is provided on said key.

10. An automotive antitheft key arrangement as set forth in claim 9, wherein said sending means comprises a sending controller producing said first pulse signal, a third transistor which is turned ON in response to said first pulse signal, and a light-emitting diode which emits in response to turning ON of said third transistor to produce said first code signal.

11. An automotive antitheft key arrangement as set forth in claim 10, wherein each of said first and second receiving means comprises a light sensitive diode and a light receiving circuit.

12. An automotive antitheft key arrangement as set forth in claim 11, wherein said light-sensitive diode comprises a infrared light sensitive diode.

13. An automotive antitheft key arrangement for locking and unlocking a vehicular door and for operating an ignition system, which comprises:

a door lock mechanism for locking and unlocking said vehicular door in response to driving of an actuator;

a starter motor for driving said ignition system;

a power source for supplying electrical power to said actuator and said starter motor when the communication therebetween is established;

a mechanically operable key for operating a starter switch;

a transmitter unit having first code signal preset means for presetting a first pulse signal, and sending means for producing a first code signal in synchronism with said first pulse signal and for sending said first code signal in response to depressing a push button provided thereto;

a receiver unit having first and second receiving means for receiving said first code signal;

a discriminator having second code signal preset means for presetting a second code signal, and a comparator for comparing said first code signal received by said first receiving means with said second code signal to produce a first comparator output when said starter switch is turned ON, and for comparing said first code signal received by said second receiving means with said second code signal to produce a second comparator output when said starter switch is turned OFF;

first means for establishing the communication between said power source and said actuator in response to said second comparator output when said starter switch is turned OFF, and for blocking the communication between said power source and said actuator when a manually operable switching means is turned ON; and second means for establishing the communication between said power source and said starter motor in response to said first comparator output when said starter switch is turned ON.

14. An automotive antitheft key arrangement as set forth in claim 13, wherein said first means comprises first transistor which is turned ON in response to said second comparator output when said manually operable switching means is turned OFF, a first relay which is turned ON in response to turning ON of said first transistor so as to establish the communication between said power source and said actuator when said manually operable switching means is turned OFF, and an interlocking means for causing said first transistor to be turned OFF in response to turning ON of said manually operable switching means.

15. An automotive antitheft key arrangement as set forth in claim 14, wherein said interlocking means includes a second transistor.

16. An automotive antitheft key arrangement as set forth in claim 15, wherein said second means comprises third and fourth transistors and a second relay which is turned ON in response to turning ON of said third transistor so as to block the communication between said power source and said starter motor when said starter switch is turned ON, said fourth transistor causing said third transistor to be turned OFF in response to said first comparator output so as to establish the communication between said power source and said starter motor when said starter switch is turned ON.

17. An automotive antitheft key arrangement as set forth in claim 16, wherein said starter switch is installed in an ignition key cylinder and wherein said first receiving means is provided on said ignition key cylinder.

18. An automotive antitheft key arrangement as set forth in claim 17, wherein said manually operable switching mean is an ignition switch.

19. An automotive antitheft key arrangement as set forth in claim 17, wherein said manually operable switching means is a accessory switch.

20. An automotive antitheft key arrangement as set forth in claim 17, wherein said transmitter unit is installed in said mechanically operable key and wherein said push button is provided on said key.

21. An automotive antitheft key arrangement as set forth in claim 20, wherein said sending means comprises a sending controller producing said first pulse signal, a third transistor which is turned ON in response to said first pulse signal, and a light-emitting diode which emits in response to turning ON of said third transistor to produce said first code signal.

22. An automotive antitheft key arrangement as set forth in claim 21, wherein each of said first and second receiving means comprises a light sensitive diode an a light receiving circuit.

23. An automotive antitheft key arrangement as set forth in claim 22, wherein said light-sensitive diode comprises an infrared light sensitive diode.

24. An automotive antitheft key arrangement as set forth in claim 14, said manually operable switching means is a warning switch which detects insertion of said mechanically operable key into a key hole provided in said ignition key cylinder.

25. An automotive antitheft key arrangement as set forth in claim 24, wherein said interlocking means applies a L-level signal to said first transistor in response to turning ON of said warning switch.

26. An automotive antitheft key arrangement as set forth in claim 25, wherein said transmitter unit is installed in said mechanically operable key and wherein said push button is provided on said key.

27. An automotive antitheft key arrangement as set forth in claim 26, wherein said sending means comprises a sending controller producing said first pulse signal, a third transistor which is turned ON in response to said first pulse signal, and a light-emitting diode which emits in response to turning ON of said third transistor to produce said first code signal.

28. An automotive antitheft key arrangement as set forth in claim 27, wherein each of said first and second receiving means comprises a light sensitive diode and a light receiving circuit.

29. An automotive antitheft key arrangement as set forth in claim 28, wherein said light-sensitive diode comprises an infrared light sensitive diode.

30. An automotive antitheft key arrangement as set forth in claim 14, wherein said manually operable switching means comprises an ignition switch and a warning switch which detects insertion of said key into a key hole provided in said ignition key cylinder.

31. An automotive antitheft key arrangement as set forth in claim 30, wherein said interlocking means comprises a second transistor which makes said first transistor OFF in response to turning ON of said ignition switch, and diodes provided between said first transistor and said warning switch so as to apply a L-level signal to said first transistor in response to turning ON of said warning switch.

32. An automotive antitheft key arrangement as set forth in claim 31, wherein said transmitter unit is installed in said mechanically operable key and wherein said push button is provided on said key.

33. An automotive antitheft key arrangement as set forth in claim 32, wherein said sending means comprises a sending controller producing said first pulse signal, a third transistor which is turned ON in response to said first pulse signal, and a light-emitting diode which emits in response to turning ON of said third transistor to produce said first code signal.

34. An automotive antitheft key arrangement as set forth in claim 33, wherein each of said first and second receiving means comprises a light sensitive diode and a light receiving circuit.

35. An automotive antitheft key arrangement as set forth in claim 34, which further comprises means for blocking the communication between said light sensitive diode and said light receiving circuit of said second receiving means so as to apply said first code signal received by said light sensitive diode of said second receiving means to said light receiving circuit thereof in response to turning ON of said ignition switch and said warning switch.

36. A automotive antitheft key arrangement as set forth in claim 14, wherein manually operable switching means comprises an accessory switch and a warning switch which detects insertion of said key into a key hole provided in said ignition key cylinder.

37. An automotive antitheft key arrangement as set forth in claim 36, wherein said interlocking means comprises a second transistor which makes said first transistor OFF in response to turning ON of said accessory switch, and diodes provided between said first transistor and said warning switch so as to apply a L-level signal to said first transistor in response to turning ON of said warning switch.

38. An automotive antitheft key arrangement as set forth in claim 37, wherein said transmitter unit is installed in said mechanically operable key and wherein said push button is provided on said key.

39. An automotive antitheft key arrangement as set forth in claim 38, wherein said sending means comprises a sending controller producing said first pulse signal, a third transistor which is turned ON in response to said first pulse signal, and a light-emitting diode which emits in response to turning ON of said third transistor to produce said first code signal.

40. An automotive antitheft key arrangement as set forth in claim 39, wherein each of said first and second receiving means comprises a light sensitive diode and a light receiving circuit.

41. An automotive antitheft key arrangement as set forth in claim 40, which further comprises means for blocking the communication between said light sensitive diode and said light receiving circuit of said second receiving means so as to apply said first code signal received by said light sensitive diode of said second receiving means to said light receiving circuit thereof in response to turning ON of said accessory switch and said warning switch.

42. An automotive antitheft key arrangement for operating an ignition system, which comprising:
   a starter motor for driving said ignition system;
   a power source for supplying electrical power to said starter motor when the communication therebetween is established;
   a mechanically operable key for operating a starter switch;
   a transmitter unit having first code signal preset means for presetting a first pulse signal, and sending means for producing a first code signal in synchronism with said first pulse signal and for sending said first code signal in response to depressing a push button provided thereto;

receiving means for receiving said first code signal;

discriminator means having second code signal preset means for presetting a second code signal, and a comparator for comparing said first code signal received by said receiving means with said second code signal to produce a comparator output when said starter switch is turned ON in response to operating said mechanically operable key; and means for establishing the communication between said power source and said starter motor in response to said first comparator output when said starter switch is turned ON.

43. An automotive antitheft key arrangement as set forth in claim 42, wherein said means comprises first and second transistors and a relay which is turned ON in response to turning ON of said first transistor so as to block the communication between said power source and said starter motor when said starter switch is turned ON, said second transistor causing said first transistor to be turned OFF in response to said comparator output so as to establish the communication between said power source and said starter motor when said starter switch is turned ON.

44. An automotive antitheft key arrangement as set forth in claim 43, wherein said transmitter unit is installed in said mechanically operable key and wherein said push button is provided on said key.

45. An automotive antitheft key arrangement as set forth in claim 44, wherein said sending means comprises a sending controller producing said first pulse signal, a third transistor which is turned ON in response to said first pulse signal, and a light-emitting diode which emits in response to turning ON of said third transistor to produce said first code signal.

46. An automotive antitheft key arrangement as set forth in claim 45, wherein receiving means comprises a light sensitive diode and a light receiving circuit.

47. An automotive antitheft key arrangement as set forth in clam 46, wherein said light-sensitive diode comprises an infrared light sensitive diode.

48. An automotive antitheft key arrangement as set forth in claim 42, wherein said second code signal preset means comprises a memory storage which electrically writes said first code signal inputted from said sending means to be memorized and reads said memorized code signal for applying the latter to said discriminator, and a switching circuit which switches between read and write of said first code signal.

49. An automotive antitheft key arrangement as set forth in claim 43, wherein said second code signal preset means comprises a memory storage which electrically writes said first code signal inputted from said sending means to be memorized and reads said memorized code signal for applying the latter to said discriminator, and a switching circuit which switches between read and write of said first code signal.

* * * * *